United States Patent [19]

Cline et al.

[11] Patent Number: 6,066,830

[45] Date of Patent: May 23, 2000

[54] LASER ETCHING OF ELECTROLUMINESCENT LAMP ELECTRODE STRUCTURES, AND ELECTROLUMINESCENT LAMPS PRODUCED THEREBY

[75] Inventors: Douglas Cline, Cheektowaga; Thomas Supples, Lackawana; George Rosenberger, Arcade, all of N.Y.

[73] Assignee: Astronics Corporation, Buffalo, N.Y.

[21] Appl. No.: 09/090,427

[22] Filed: Jun. 4, 1998

[51] Int. Cl.[7] .......................... B23K 26/00; H05B 33/12; H05B 33/22

[52] U.S. Cl. .................... 219/121.69; 219/121.76; 219/121.8; 313/506

[58] Field of Search ................ 219/121.67, 121.68, 219/121.69, 121.72, 121.78, 121.76, 121.77, 121.8; 313/503, 506, 509

[56] References Cited

U.S. PATENT DOCUMENTS

| | | |
|---|---|---|
| 2,901,652 | 8/1959 | Fridrich . |
| 2,928,974 | 3/1960 | Mash . |
| 2,944,177 | 7/1960 | Piper . |
| 2,945,976 | 7/1960 | Fridrich et al. . |
| 3,110,836 | 11/1963 | Blazek et al. . |
| 3,110,837 | 11/1963 | Wollentin . |
| 3,114,853 | 12/1963 | Bouchard . |
| 3,148,299 | 9/1964 | Devol et al. . |
| 3,315,111 | 4/1967 | Jaffe et al. . |
| 3,497,750 | 2/1970 | Knochel et al. . |
| 3,519,871 | 7/1970 | Kanie . |
| 3,895,208 | 7/1975 | Kraus . |
| 4,097,776 | 6/1978 | Allinikov . |
| 4,425,496 | 1/1984 | le Fur et al. . |
| 4,455,324 | 6/1984 | Kamijo et al. . |
| 4,511,641 | 4/1985 | Busman et al. . |
| 4,534,743 | 8/1985 | D'Onofrio et al. . |
| 4,614,668 | 9/1986 | Topp et al. . |
| 4,626,742 | 12/1986 | Mental . |
| 4,647,337 | 3/1987 | Simopoulos et al. . |
| 4,665,342 | 5/1987 | Topp et al. . |
| 4,684,353 | 8/1987 | deSouza . |
| 4,745,334 | 5/1988 | Kawachi ................................ 313/512 |
| 4,856,392 | 8/1989 | Appelberg . |
| 4,904,901 | 2/1990 | Simopoulos et al. . |
| 4,957,900 | 9/1990 | Yamazaki ................................ 505/1 |
| 5,223,687 | 6/1993 | Yuasa et al. ............................ 219/68 |
| 5,276,382 | 1/1994 | Stocker et al. ........................ 313/506 |
| 5,332,946 | 7/1994 | Eckersley et al. .................... 313/506 |
| 5,702,565 | 12/1997 | Wu et al. ................................ 216/65 |
| 5,757,125 | 5/1998 | Furlong et al. ....................... 313/503 |
| 5,811,930 | 9/1998 | Krafcik et al. ........................ 313/506 |

FOREIGN PATENT DOCUMENTS

| | | |
|---|---|---|
| 731367 | 6/1955 | European Pat. Off. . |
| 746669 | 3/1956 | European Pat. Off. . |
| 765076 | 1/1957 | European Pat. Off. . |
| 778907 | 7/1957 | European Pat. Off. . |
| 799141 | 8/1958 | European Pat. Off. . |
| 0 476 856 B1 | 6/1994 | European Pat. Off. . |
| 1 097 029 | 1/1961 | Germany . |
| 9-274989 | 10/1997 | Japan . |

*Primary Examiner*—Geoffrey S. Evans
*Attorney, Agent, or Firm*—Edward H. Green, III; Steven J. Hultquist

[57] ABSTRACT

A process for manufacturing electroluminescent lamps using a laser beam to remove a material layer of a multi-layer material structure, in which the laser beam has a first energy level directed at a first material layer, e.g., a conductor, laid over a second material layer, e.g., an insulator/substrate. The laser beam is moved in an overlapping fashion such as spiral pattern motion across the first material layer. A part of the first material layer is sublimed exposing a region of the second material under the area where the spiral pattern was applied. Additionally, a second laser beam having a second energy level, e.g., higher than the first energy level, is moved along a path over the exposed second material layer subliming the remaining underlying layers to form the final lamp shape.

29 Claims, 6 Drawing Sheets

LASER ETCHING OF ELECTROLUMINESCENT LAMP ELECTRODE STRUCTURES, AND ELECTROLUMINESCENT LAMPS PRODUCED THEREBY

BACKGROUND OF THE INVENTION

1. Field of the Invention

The present invention relates to an improved method of manufacture of EL lamps, and to electroluminescent lamps produced thereby.

2. Description of the Related Art

Electroluminescent ("EL") lamps commonly comprise a laminated assembly including phosphor material, a dielectric layer, and front and rear electrodes, with leads for applying an alternating electric field across the electrodes, to cause the phosphor to emit radiant (luminescent) energy, e.g., in the visible light spectrum, infrared, or ultraviolet spectrum.

In such EL lamps, the phosphor material and dielectric layer between the electrodes, generally maintain the two electrodes in separated relationship to one another, thereby preventing them from short-circuiting.

For such purpose, and to electrically isolate the phosphor layer from the rear electrode, it has been conventional practice to pattern the rear electrode conductive material, since the front electrode typically is formed as a continuous metallization layer of appropriate size and shape of the supporting substrate, e.g., a polymeric film such as Mylar® film. Such patterning of the rear electrode may be carried out by silk-screening, to apply the electrode as a conductive metalpolymer paste in a specific final shape configuration which will achieve the desired electrical isolation of the phosphor layer from the electrical field. Alternatively, the metallized front electrode supported by the substrate could be subjected to chemical, laser or mechanical metal-removal processes prior to applying the subsequent lamp layers, but same are typically for the manufacture of a pre-determined final lamp shape configuration.

Accordingly, it would be a significant advance in the art to provide a methodology for the ready manufacture of variable final EL lamp configurations by the selective removal of the rear electrode metal layer from a continuous, pre-printed EL lamp blank, to achieve the desired electrical isolation pattern of the phosphor layer from the electrical field imposed by means of the front and rear electrodes of the lamp with an associated power supply.

Relative to the state of the art in the field of the invention, relevant references are described below.

U.S. Pat. Nos. 5,276,382 and 5,332,946 teach the use of a thin "line of interruption" in which a portion of the continuous conductive material of the substrate supported front electrode, in the form of a line between 0.005 and 0.010 inches wide, is removed by laser ablation, directly or though a mask, prior to the application of selectively pre-applied lamp layers. The line of interruption creates an isolated island that is electrically discontinuous from the remainder of the front electrode, and provides the electrically isolated lead attachment area and/or the final end product lamp edges.

By this arrangement, a lead making contact with the outer rear electrode can be attached to a region previously electrically isolated from the underlying main body of the front electrode. Short circuiting between the front and rear electrodes will not occur within this electrically isolated region when performing lead attachment to the outer electrode e.g., as a result of a crimping-type lead connector being applied to the laminated structure. The prior art also teaches that the front electrode main body becomes isolated from the edges of the final lamp shape by ablating a line of interruption prior to applying the remaining lamp layers.

The method disclosed in U.S. Pat. Nos. 5,276,382 and 5,332,946 is used during the lamination layering process and manufacture of EL lamps. Electrically isolated sections of the front electrode are outlined by the "line of interruption", followed by subsequent layering. The configuration of the electrically isolated sections is determined by the pre-selected rear electrode pattern based upon a pre-determined final lamp configuration. The remaining separation layers are laminated over the electrically isolated front layer followed by the pre-patterned rear electrode. The product EL lamp is then cut to its final pre-determined shape by some mechanical means.

U.S. Pat. No. 5,702,565 to Wu et al. uses a similar but slightly more sophisticated front electrode "line of interruption" ablation technique to form multiple electrically isolated "address lines" in the front electrode layer of an EL laminate. These parallel address lines are formed by directing a laser beam through the front (transparent) side of a fully layered EL laminate onto the top surface of the underlying layer of the EL laminate. Typically, the underlying layer includes the dielectric layer(s) and the rear electrode layer. The laser device must be precisely adjusted to pass through each of the individual overlying layers, which include a transparent top layer, transparent front electrode layer and the phosphor layer. The laser beam directly ablates a portion of the top surface of the underlying layer creating sufficient heat energy to vaporize a thin line of the transparent front electrode layer. The laser beam is line indexed over the front side of the EL laminate forming over 200 parallel and electrically isolated lines per inch distance.

Although the method disclosed in U.S. Pat. No. 5,702,565 has the advantage of being a postproduction EL laminate process, it does not apply to the removal of large sections or regions of an electrode layer. Additionally, the technique of directing a laser beam through multiple overlying layers to ablate the top surface of the underlying layer is expensive and requires exacting precision. The exact properties of the each material layer and their thickness must be known as well as the precision and resolution of the laser in order to avoid explosive delamination of the intervening layers and to minimize interdiffusion between the layers.

Mechanical devices have also been proposed to remove a narrow line of the conductive material to form multiple electrodes. See, for example, U.S. Pat. No. 4,534,743. One means disclosed for removing a portion of the conductive material is the application of a solvent to the material, followed by removal of the material portion with a wire brush, thereby creating a "narrow groove" in the conductive material, providing at least two laterally spaced electrodes.

Alternatively, a precision saw blade might be used. The size of the narrow groove is approximately 0.127 millimeters (0.005 inch).

The method disclosed in U.S. Pat. No. 4,534,743 of wire brushing the conductive material uses the edges of the wire brush to remove the conductive material, with the bristles of the wire brush being perpendicular to the axis of the shaft of the tool used to direct the brush. The patent describes the use of a shielding device to construct a thin line cut, and to protect the functional rear electrode material. This method, however, may undesirably result in removing material at different depths, since it is difficult to control the edges of the brush with precision. This in turn can cause damage to the underlying substrate, thereby weakening the lamp. Further, the narrow groove formed by the wire brushing could permit an electric arc to traverse the groove, thereby causing a short circuit. The method disclosed is suitable for producing a split rear electrode lamp with twice the voltage drop of the conventional parallel electrode lamps. The method, however, does not lend itself to complex lamp configurations and end product final lamp shapes.

Another technique for removing a portion of the conductive material on an electrode is disclosed in U.S. Pat. No. 5,223,687. This patent teaches the creation of a fine pattern on the electrode, thereby creating multiple electrodes suitable for illuminating multiple lighted areas within a liquid crystal display. A metal electrode is employed, having a needle-like tip through which a voltage is applied between such metal electrode and the conductive material, thereby etching a narrow groove in the conductive material. The size of the area in which the conductive material is removed extends up to 10 microns around the contacting area.

Similar to the result in U.S. Pat. No. 5,702,565 discussed above, U.S. Pat. No. 5,223,687 teaches the formation of multiple parallel lines extending across the electrode using a metal electrode with multiple needle-like tips to remove thin lines of conductive material. The drawbacks to this approach include the difficulty of accurately controlling an electrode with a small needle tip that concentrates the electric charge, as well as removing the resulting scattered etched particles from the electrode substrate. Furthermore, the use of significant voltages may create safety hazards. In addition, the removal of an area of the conductive material, which is 10 microns in width, of itself, may not prevent electrical arcing, and consequently such processing may still result in significant risk of short-circuiting in the use and operation of the lamp constructed from such electrode. As is the case with most of the prior art discussed, this method of electrode removal is applied during the manufacturing process of the EL lamp and is not practical for use with a completely layered EL laminate.

Another approach for removing an area of conductive material is disclosed in U.S. Pat. No. 4,745,334. This patent teaches cutting out a portion of the rear electrode in the vicinity of the area in which lead terminals are attached to the front electrode of the lamp. The lead terminals are attached using a printed board. This method is employed in order to apply heat to the terminals of the lamp at an area distant from the lamp. This method requires the removal of a portion of the entire front electrode layer and supporting substrate, e.g., polymeric film. Accordingly, the portion of the lamp article having the front electrode cut away introduces a significant variation in thickness to the lamp, which may be detrimental from a packaging or aesthetic standpoint. Further, the cutting operation introduces a processing step which increases the complexity of the manufacturing process, and which may result in damage to the metal coating incident to the severing of the portion to be excised, in connection with the stresses thereby imparted to the electrode layer at distances beyond the cut-out portion. Such stresses may result in delamination of the metal film on the substrate, with consequent adverse effect on the performance of the resultant lamp article.

Thus, most of the prior art approaches remove a portion of the conductive material as an integral part of the EL material layering process. The end result being that the desired electrode pattern is pre-determined based upon the defined manufacturing process. The final El lamp shape is also a function of the configuration of the pre-printed layers that make up the EL laminate. The only prior art method approach used to remove a portion of the conductive material on post-laminated EL lamp material is highly specific and not designed to remove relatively large regions of electrode material. Further, the prior art emphasis on removal of conductive material from an electrode structure typically has focused on the front electrode and associated "lit" surface of the EL lamp, and the art has not addressed satisfactorily metal removal from the rear electrode for electrical isolation of the phosphor material. Finally, none of the prior art approaches incorporate a technique for selectively forming the final EL lamp shape from a stock EL laminate material, or EL "blank" sheet. An EL blank represents the fully layered EL laminate material, with the same "blank" being usefully employed for any of a multiplicity of designs.

The present invention is directed to, inter alia, an improved EL lamp and appertaining method of manufacture.

SUMMARY OF THE INVENTION

In one aspect, the present invention relates to an effective method of finalizing an EL lamp illumination configuration and lamp shape from a fully laminated EL lamp blank. The method includes the removal of a first material layer of the multi-layered EL blank by directing a first laser beam having a first energy level at the first material layer. A part of the first material layer is resultingly sublimed exposing a region of the second material layer under the selected pattern.

Subsequent to such laser-mediated sublimation of the first material layer, further processing of the EL blank may be carried out to define the end product lamp shape in which a second laser beam having a second energy level is directed at the exposed region of the second material layer and is moved along the exposed second material layer subliming the remaining material layers in a line within the exposed region of the second material layer. This second laser beam has the effect of delineating the edges of the final product lamp. The second laser beam may be from a separate laser apparatus, or may be a subsequently generated beam of the same laser apparatus, at a different (second) energy level relative to the first laser beam.

In yet another aspect, the present invention relates to a method of making an EL lamp including a first conductive layer, a phosphor layer, a dielectric layer, and a second conductive layer, wherein the second conductive layer is removed to achieve electrical isolation of the phosphor layer from an electrode defined from the first conductive layer, such process comprising depositing a first transparent conductive layer on a typically optically clear substrate. A layer of phosphor is deposited over the first conductive layer. One or more dielectric layers are deposited over the layer of phosphor, and a second conductive layer is deposited over the dielectric layer. A first laser beam having a first energy level is directed at the second conductive layer and is moved across the second conductive layer with an overlapping motion as necessary to remove an entire region of the second conductive layer. The second conductive layer thereby is sublimed exposing a region of the dielectric layer under the overlapping pattern. Optionally, a second laser beam having a second energy level is directed at the exposed region of the dielectric layer and is moved along the exposed region of the dielectric layer subliming a line of material including the dielectric, the phosphor material, the first conductive layer, and the substrate material.

In still another aspect, the present invention relates to a method of making an EL lamp, in which a conductive layer-coated film is employed as the rear electrode layer of a multi-layer EL lamp, wherein the rear electrode is patterned by laser ablation of conductive material in accordance with the method of the invention, comprising lasing of the conductive metal material with a laser beam translated in an overlapping spiral motion across the conductive metal to sublime the conductive metal in areas contacted by laser energy, to expose a region of the underlying film, and optionally translating a laser beam along exposed areas of the underlying film to sublime underlying film material defining the edges of the product EL lamp. As described hereinabove, the second lasing action, directed to the underlying film, may utilize a laser beam from the same apparatus used in the initial lasing step, or a second laser apparatus may be employed to generate such beam directed at the underlying film exposed areas.

In a device aspect, the invention relates to an EL lamp including sequential front electrode, phosphor, dielectric and rear electrode layers, wherein the rear electrode comprises a metalized film including a marginal region demetalized by an overlapping lasing action such as spiral loop lasing to electrically isolate the phosphor layer from the rear electrode, with the demetalized marginal region optionally comprising a trench cut thereon.

Other aspects, features and other embodiments of the invention will be more fully apparent from the ensuing disclosure and appended claims.

DETAILED DESCRIPTION OF THE INVENTION, AND PREFERRED EMBODIMENTS THEREOF

Figure 1:
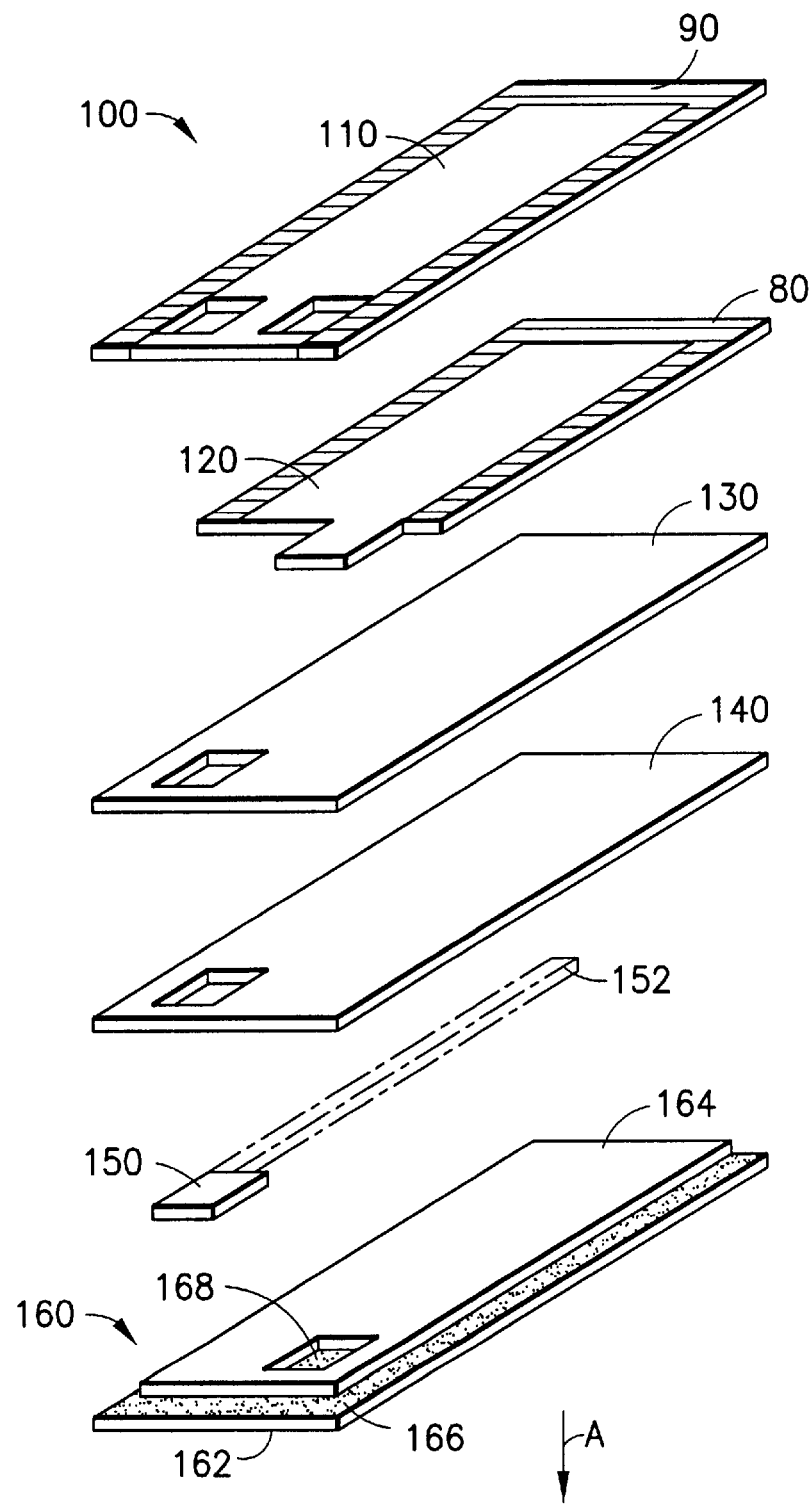
FIG. 1 is a perspective schematic representation of the individual layers of an EL lamp assembly, in exploded relationship to one another.

The disclosure of co-pending U.S. patent application Ser. No. 08/555,595 filed Nov. 9, 1995 now U.S. Pat. No. 5,757,125, in the names of Kim Furlong, et al. for "EL LAMP WITH LEAD ATTACHMENT ISOLATION STRUCTURE, AND ROTARY ABRASION METHOD OF MANUFACTURE THEREOF," now allowed, is hereby incorporated herein by reference, in its entirety.

The present invention overcomes the drawbacks of the prior art, as described in the "Background" section hereinabove, in the provision of improved EL lamps and an improved method for making such lamps.

The method of the invention achieves a considerable simplification of manufacturing over the prior art techniques of fabricating quick turn-around, off the shelf EL lamps.

The EL lamp of the invention comprises a front electrode layer, a rear electrode layer, and disposed between these electrode layers, phosphor material and a dielectric layer. The terms "front" and "rear" in relation to the electrodes and electrode layer structures of the invention, are employed herein in reference to the light emitting (illumination display) surface of the lamp article as the "front" face or side of the lamp, and the opposite surface as the "rear" face or side of the lamp.

In accordance with the invention, the EL lamp comprises a rear electrode layer which includes a conductive material film coated over the surface of a substrate, with a region, e.g., an edge isolation region wherein the conductive material film has been removed from the substrate surface by laser etching. The aforementioned edge isolation region thus is defined by at least partial, and preferably substantial, absence of the previously coated metal film, as removed by the laser etching.

The invention contemplates the use of laser energy, impinged on the conducting material-coated substrate, to remove the conductive material, e.g., substantially completely, on a predetermined region of the electrode layer which has been previously coated with the conductive material, e.g., metal, conductive polymer, inter-metallic composition, or other suitable conductive material, etc. The predetermined region may for example be a lead attachment region to attenuate or minimize the occurrence of short-circuiting in consequence of the lead attachment and appertaining connector structure, and/or the predetermined region may comprise an edge or marginal region of the electrode layer, for edge isolation of the lamp's conductive electrode, to attenuate or minimize the occurrence of edge shorting incident to the handling or contact with the edges of the EL lamp comprising such isolation structure, and to electrically isolate the phosphor layer from the electrical field imposed on the EL lamp for operation thereof.

The present invention contemplates the manufacture of EL lamps by removal of metal from edge regions of the rear electrode, so that the phosphor layer is electrically isolated, to maximize the illumination efficiency of the lamp and preclude the occurrence of short circuiting which can severely impair the usefulness of the lamp article.

The laser utilized in the preferred embodiment of the invention is a Nd (neodymium):YAG (yttrium-aluminum-garnet) laser which generates a beam of laser radiation of sufficient intensity to sublimate (volatilize) the conductive metal coated on the substrate to be demetalized. Alternative, but less effective lasers include $CO_2$ CW (continuous wave)

pulsed lasers, $CO_2$ TEA (Transverse Excitation at Atmospheric pressure) pulsed lasers, Excimer lasers, Er (Erbium):YAG lasers; ion-argon lasers, ion-krypton lasers, nitrogen pulsed lasers, ruby lasers and titanium sapphire lasers.

The Nd:YAG laser (or other acceptable laser) is suitably aligned to the metal-coated substrate article, in orientation to the region of the article to be demetalized. A computer controller directs the laser beam by suitable control software, such as a CAD (computer aided drafting) software program. The settings and programming of the laser apparatus direct the laser beam in a translational path including an overlapping movement of the laser beam so that same impinges on the metal-coated substrate article over a region of electrode layer to be removed. The preferred overlapping laser beam movement is an overlapping spiral movement making a series of circles or circle-like arcs which are displaced in series from one another, so as to have individual spiral loops of the translation be in proximity to one another, with the loops being overlapped in sequence, so that the loop of a single pass of a laser beam is at least intersected by the next succeeding loop, and preferably the loops are in very close proximity to one another so as to be closely overlapping in character. Such repetitive spiral loop and translational motion of the laser beam is hereafter referred to as "spiral-loop lasing."

Thus, the laser beam is translated to effect spiral-loop lasing of the metal film on the substrate, so that the laser beam removes the metal film layer and leaves the underlying substrate substantially in tact. The demetalizing laser beam is rotated in a circular motion for the spiral-loop lasing operation, at a very high speed with movement of the laser along the overall path of translation, to remove the metal in the desired region.

Although spiral-loop lasing has been shown to be a preferred laser etching method according to the invention, other overlapping laser beam patterns can effectively achieve the same result. An example would be an overlapping zigzag lasing pattern wherein the laser beam is zigzag down a region of the conductive material layer to be removed followed by multiple return zigzag paths subliming portions of the conductive layer not removed during previous paths of the laser. In order to most effectively remove the conductive material layer from the identified region, the peaks and valleys of the zigzag pattern are highly compressed so as to minimize the number of return paths necessary to removed the conductive material.

After a region has been demetalized by spiral-loop lasing or other overlapping lasing, it may be desirable to direct a higher energy laser beam at the demetalized region to "cut through" and form an isolation path in the demetalized region, to ensure that no metallic residuum remains on the substrate. This deep laser cut effectively isolates electrical contact with the rear electrode layer and insulates the edges of the final EL lamp from contact with the external environment.

In other words, the subsequent "line-cutting" laser effects the formation of a laser "trench" in the substrate, thereby forming an isolation trench in the substrate which serves to additionally electrically isolate regions on the other side of the initial overlapping lasing path.

The final "trench cut" lasing action may be carried out so that the trench in the substrate is formed along the centerline of the spiral loops or zigzag pattern, so that the trench is formed along the line traced by the center of the overlapping pattern formed by the laser beam during the overlapping lasing action.

In conventional practice, the formation of EL lamps is performed in several steps, with considerable step-up time in special tools being required. Typically, five silk screens and art works must be made for each lamp design, with the raw material being screened, following which a die is employed to punch the lamp out into its final shape.

Utilizing the laser demetalization method of the present invention, five silk screens and art works are utilized for the generic "blank" sheet, such blank being a metal-coated substrate film, with the same "blank" being usefully employed for any of a multiplicity of designs. The lasing action removes the selected portions of the rear electrode, to sufficient extent to provide the desired extent of electrical isolation of the phosphor layer, and the lamp then is cut out to its final shape.

Thus, the method of the invention allows for a single set-up operation and high volume productions runs of "blanks" and computer driven customization in large or small quantities. As a result, substantial savings are achieved in set-up, clean-up and tooling for the manufacture of the EL lamp.

By this method, a single type of sheet stock for an EL lamp supported on a metal-coated Mylar* film may be readily utilized for construction of the lamp, with the overlapping lasing then being utilized to provide a "pattern" rear electrode substrate, having the conductive electrode material in selected regions of the substrate article, to achieve the desired electrical isolation concurrent with effective power introduction to the lamp, via such electrode.

A Nd:YAG lasing medium or close substitute is critical in the practice of the invention, for demetalization of the film, and other lasing media are markedly inferior and unsatisfactory for such demetalization.

The outside shape of the EL lamp may be cut first or last in the manufacturing operation, as hereinafter described in greater detail, and such cutting may be effected with dies or with a different lasing medium, e.g., a $CO_2$ laser. As mentioned, lasing media such as $CO_2$ may not, however, be suitable for the demetalization operation in the method of the present invention.

While the invention is described herein primarily with reference to a metal conductive film which is removed by impingement of laser energy thereon, the applicability of the present invention is not thus limited, and the method of the invention may be used for selective removal of coatings or material layers on surfaces or substrate elements, in a wide variety of potential applications, such as removing adhesion-resistant coatings from substrate articles, to subsequently bond fixtures or structures thereto, or other applications where a thin material layer is desired to be selectively removed in particular regions of the coated article.

The power and settings of the Nd:YAG laser may be readily determined by simple experiment on the coated substrate of choice, by the simple expedient of varying the intensity and speed of movement of the laser beam, and determining the extent of material removal achieved thereby. The material to be removed must have enough "contrast" at the wavelength of the laser (1064 nanometers for the Nd:YAG laser) to achieve differentiation between the multiple layers. The surfaces to be lased must be flat and not encapsulated by a layer or coating that would insulate or capture the laser wave length or gases generated by the vaporization of the layer being removed. There are, however, certain transparent moisture and/or electrical protection layers that cover the rear electrode layer region (to be removed) that will not interfere with the lasing technique with proper adjustment of the Nd:YAG laser. Such acceptable moisture layers such as Aclar® fluoropolymers, UV and heat cured dielectrics. The lased metal electrode region simply vaporizes through the moisture protection layer of the rear electrode.

The present invention therefore achieves a substantial advance in the art, obviating the necessity of predetermined lamp shape and electrode patterning, chemical removal or mechanical (e.g., abrasion) removal. The method of the invention therefore may be usefully employed to remove an overlying layer from an underlying layer from a multi-layer material structure, to electrically isolate, for example, one material from another. The materials and construction of an EL lamp in which the structure and method of the invention may be employed are described, for example, in U.S. Pat. No. 5,276,382, which is incorporated by reference herein in its entirety, although it is to be recognized that the lamp of the invention may be widely varied in its structure and component materials, within the skill of the art.

Preferably, the lamp is a thin, flexible, multi-layered assembly formed by coating or otherwise depositing the layers of the lamp on a large base panel forming the EL laminate or EL blank, followed by cutting out the individual lamps from the blank. Flexible lamps are preferably formed in rectangular shape, although any suitable shape or conformation may be employed. Preferably, there are registration targets or indicia in the blank for the purpose of orientation within the blank and from one blank to the next.

In preferred embodiments of the present invention, the lamp may be from about 0.006 to about 0.030 inch thick, and most preferably, the lamp is on the order of about 0.012 inch thick, although the thickness and other dimensions of the lamp may be widely varied in the broad practice of the invention. The lighted area of the lamp is desirably maximized within the overall dimensional constraints of the given lamp article or, alternately, minimized to reduce unwanted additional power consumption.

The overall lighted area of the lamp may optionally comprise multiple, constituent lighted areas within one lamp, and each lighted area may optionally be individually activated, and may optionally have different light color illumination areas. Lamps may generate light of a single color or the lamp may be constructed so that different regions of the lighted area of the lamp generate light in respectively different colors. In preferred embodiments, the rear electrode is opaque so that light is emitted only from the front surface of the lamp.

Lamp articles according to the present invention may entail a variety of constructions, shapes, sizes and conformations, as may be necessary and/or desirable in a given end use application of such lamps. The product lamp article may be encased in a moisture-resistant envelope of Aclar® polymer or other useful material of suitable low moisture permeability characteristics, as a so-called encapsulated lamp or packaged lamp. Alternatively, the product lamp article of the invention may be of an unpackaged design as hereinafter shown and described.

FIG. 1 shows an EL lamp 100 according to one embodiment of the present invention, comprising the following constituent layers: a moisture barrier layer 110 with the edges 90 lasered back, rear electrode 120 with the edges 80 lasered back on three sides, dielectric layer 130, phosphor layer 140, front lead pad 150 connected to optional busbar 152, and front electrode layer 160. The front electrode layer 160 comprises a base substrate 162, e.g., Mylar® film, having a conductive material film 164, such as indium tin oxide (ITO) coated thereon, which has been processed to form a lead isolation area 168 and an edge isolation area 166 as dematerialized regions of the conductive material film exposing the base substrate 162 as shown.

In this lamp assembly as shown and oriented in FIG. 1, the light emitting side of the lamp article is the bottom face of the front electrode layer 160, which in operation emits light in the direction generally indicated by arrow A in the drawing.

Figure 2:
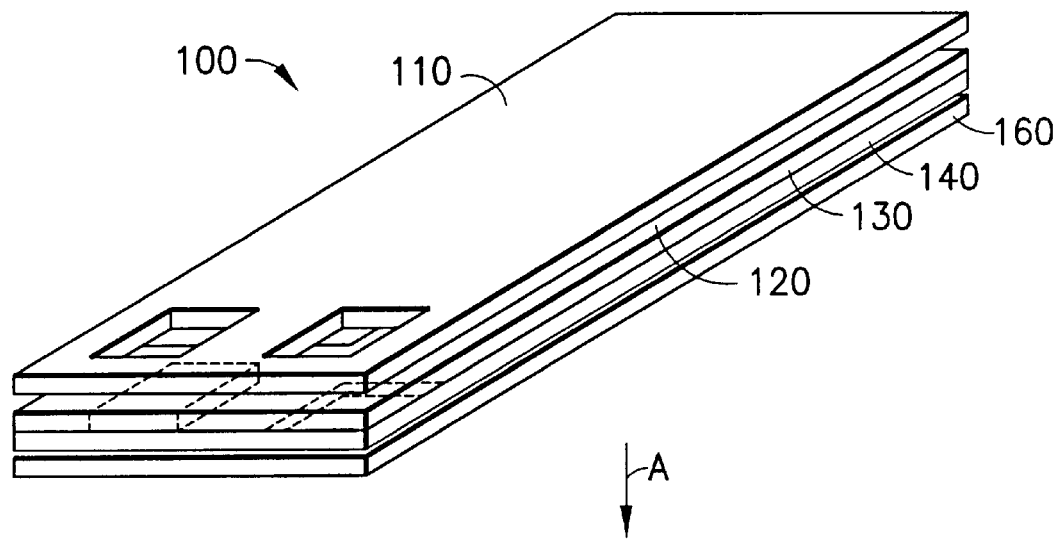
FIG. 2 is a perspective simplified schematic view of the assembled EL lamp whose constituent layers are shown in FIG. 1, prior to any laser etching of the rear electrode and rear barrier layers.

The assembled lamp article 100 is shown in FIG. 2, prior to the laser removal of the rear electrode metal film edge regions and the rear barrier layer edge regions.

Figure 3:
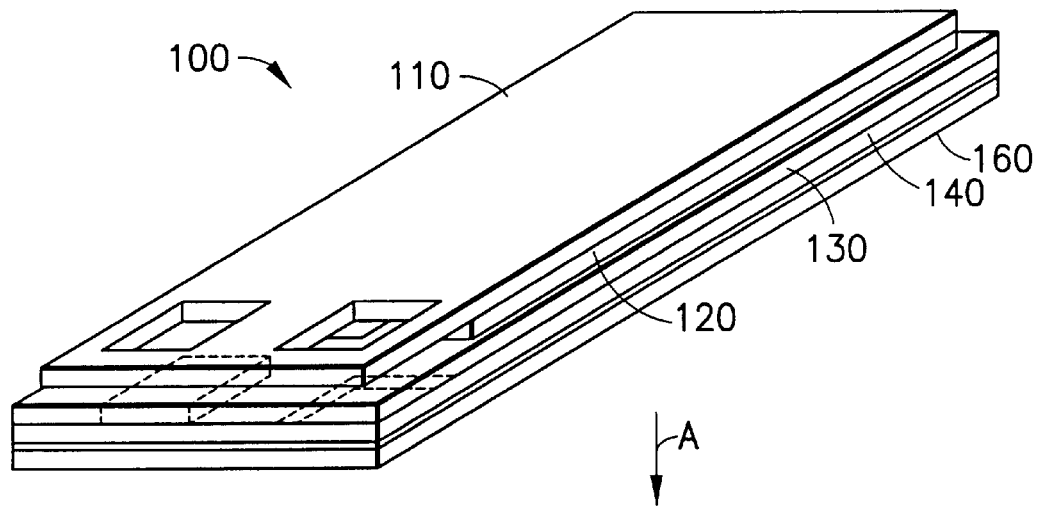
FIG. 3 is a perspective simplified schematic view of the assembled EL lamp of FIG. 2, after laser etching of the rear electrode and rear barrier layers.

FIG. 3 shows a simplified schematic representation of the assembled lamp article 100, after laser removal of the metal on the edge regions of the rear electrode 120 and removal of the rear barrier layer 110 edge regions, as illustrated. The lasing has been carried out on the FIG. 3 article so that the rear electrode and the barrier layer are "cut back" on three sides, so that such layers are inset as shown. The dielectric layer 130 underlies the rear electrode and barrier layers. By the arrangement shown, the phosphor layer 140 is isolated from the rear electrode.

Figure 4:
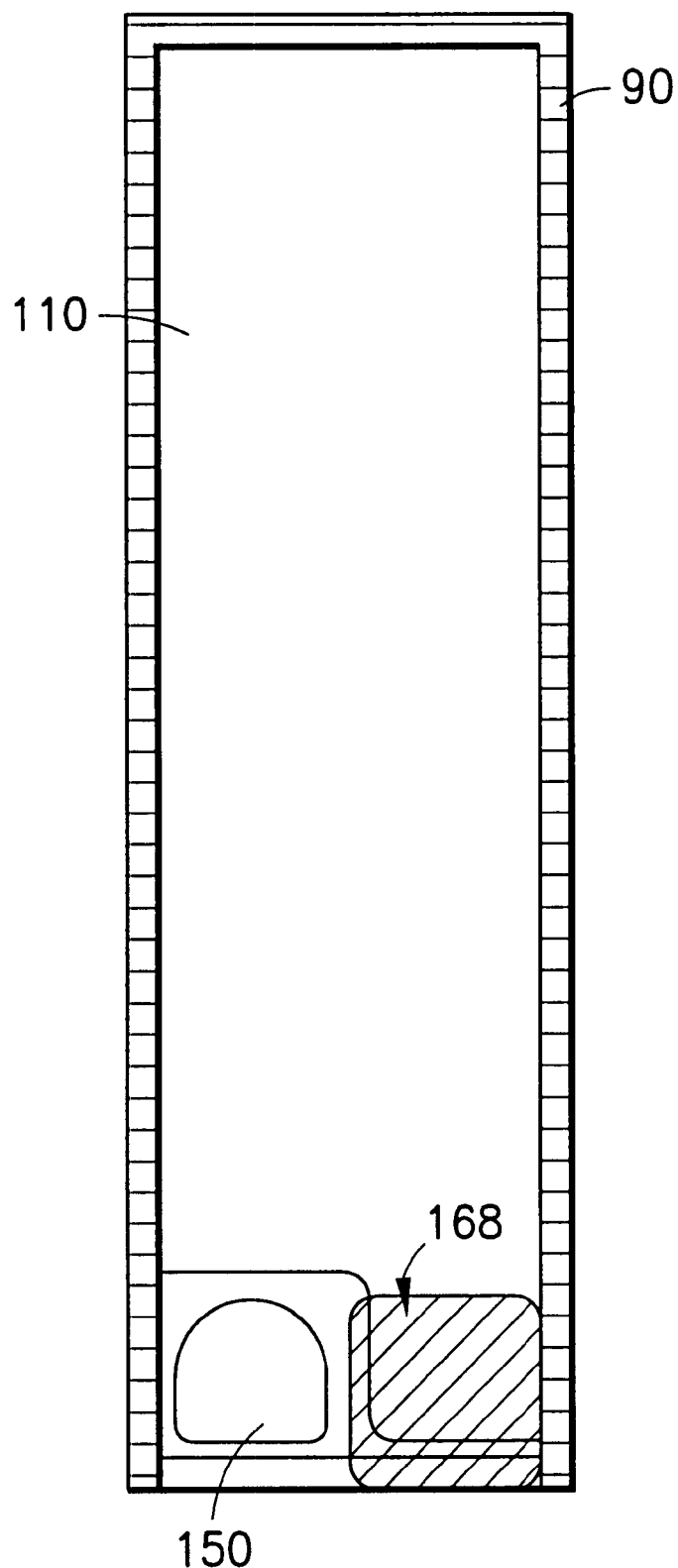
FIG. 4 is a top plan view of the rear or unlit face of the lamp, showing regions of removal of metal.

FIG. 4 is a top plan view of the rear or unlit face of the lamp, showing regions of removal of metal. The rear barrier layer 110 in accordance with the invention is etched back to remove the edge regions 90. The region 168 under the rear electrode leadset may be demetalized to remove the conductive metal film in such region of the article. Region 150 accommodates the front electrode lead connection pad for the lamp article.

Figure 5:
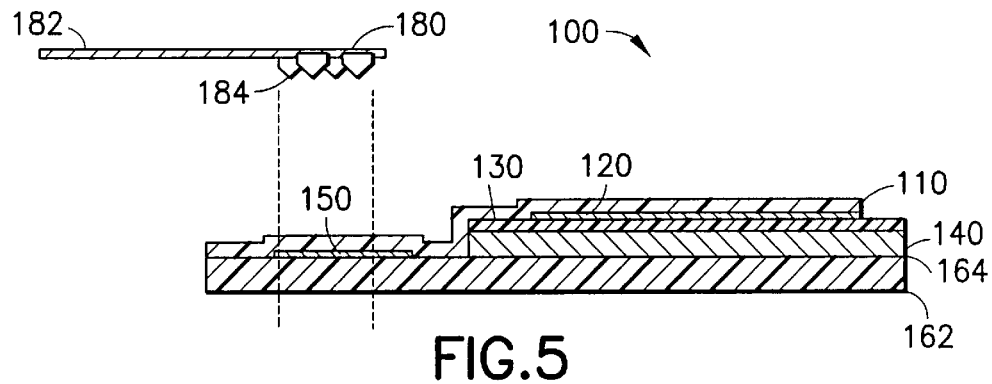
FIG. 5 is a cross-sectional elevation view of an end portion of the EL lamp assembly, showing the front lead crimp connector in exploded relationship to the main structure of the lamp.

FIG. 5 is a cross-sectional elevation view of an end portion of the EL lamp assembly 100 of FIGS. 1–3, showing a front lead crimp connector 180 in exploded relationship to the main structure of the lamp. The front lead crimp connector 180 comprises lead element 182 and multiple tines 184, and engages the front lead pad 150 and the front electrode 162. The front lead crimp connector is joinable by means of lead element 182 to a suitable power supply (not shown). The rear electrode 120 and the rear barrier layer 110 are marginally inset from the underlying layers of the lamp assembly, as a result of the etch-back removal of the rear electrode and rear barrier layers.

Figure 6:
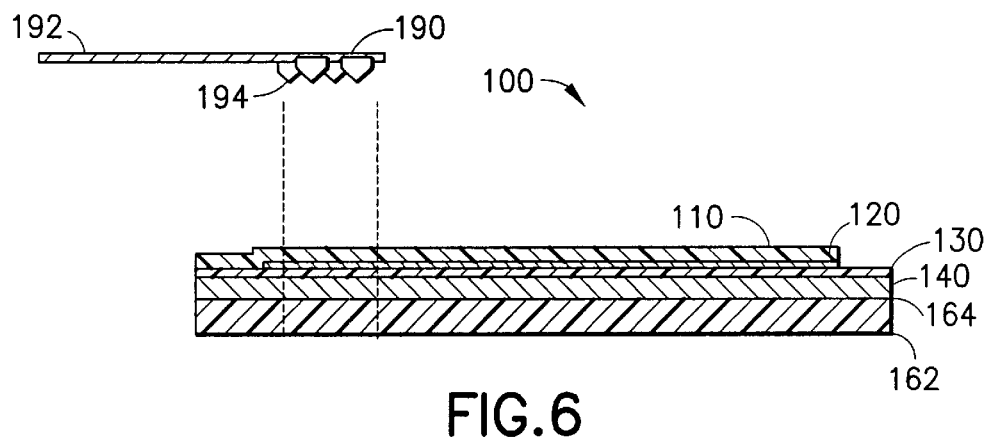
FIG. 6 is a cross-sectional elevation view of an end portion of the EL lamp assembly, showing the rear electrode crimp connector in exploded relationship to the main structure of the lamp.

FIG. 6 is a cross-sectional elevation view of an end portion of the EL lamp assembly 100 of FIGS. 1–3, showing the rear electrode crimp connector 190 in exploded relationship to the main structure of the lamp. The rear electrode crimp connector 190 comprises lead element 192 and multiple tines 194, and engages the rear electrode 120. The rear electrode crimp connector 190 is joinable by means of lead element 192 to the power supply (not shown), in circuit relationship to the power supply with lead element 182 electrically connected to the front lead pad 150 and the front electrode 162. As shown, the rear electrode 120 and the rear barrier layer 110 have been etched away at their side margins, in relation to the underlying layers of the EL lamp assembly.

Figure 7:
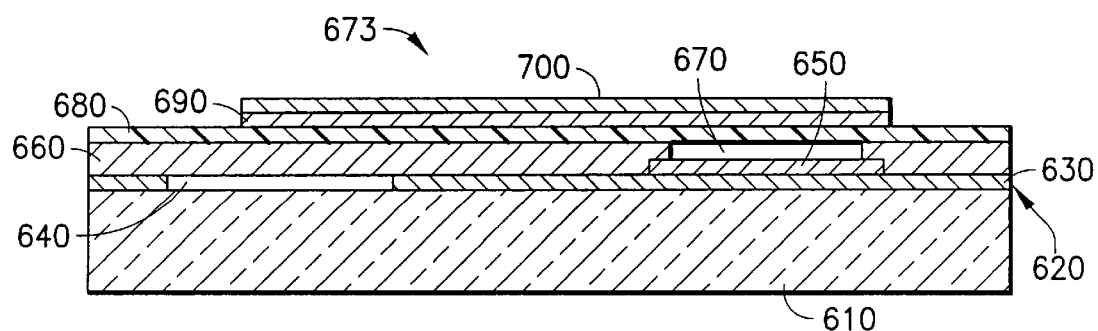
FIG. 7 is a cross-sectional elevation view schematic representation of an EL lamp according to the present invention.

A cross-sectional elevation view of an example of an EL lamp 673 according to one embodiment of the present invention is shown schematically in FIG. 7. As illustrated, the substrate layer 610 of the front electrode 620 has a layer of conductive material 630 from which a region 640 has been formed by rotary abrasion, thereby eliminating the conductive material in the area subjected to the mechanical rotational abrasion. The front electrode 620 is connected to a front lead pad and optional bus bar 650 for connection to a lead terminal. The front electrode 620 and the optional bus bar 650 are layered over by a phosphor layer 660, which has a window 670 over the front lead pad. The dielectric layer 680 is placed adjacent to the phosphor layer 660, and also has a window (not shown) over the front lead pad. The rear electrode 690 is layered over the dielectric layer 680, and has a window (not shown) over the front lead pad. The exposed layers are then layered over by the moisture barrier 700 and also have a window over the front lead pad and rear lead pad. As illustrated, the marginal regions of the rear electrode and the moisture barrier layer 700 have been laser etched to inset the side edges in relation to the underlying layers of the EL lamp assembly.

Figure 8:
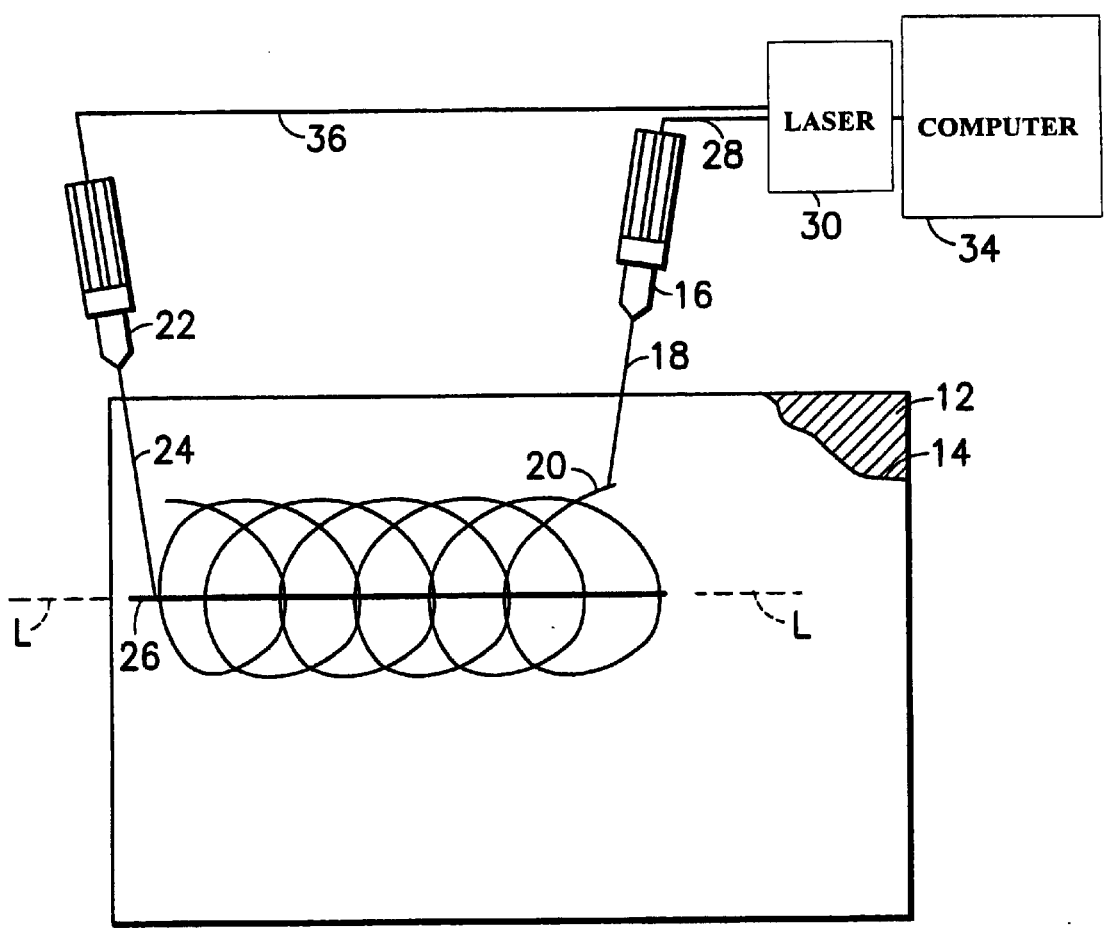
FIG. 8 is a simplified schematic representation of the laser etching system of the invention, as operating on a metal-coated substrate article, and showing the path of the spiral laser beam pattern and linear laser beam pattern, utilized in the process of the present invention.

FIG. 8 is a simplified schematic representation of the spiral loop laser etching system of the invention, as operating on a metal-coated substrate article, and showing the path of the spiral laser beam pattern and linear laser beam pattern, utilized in the process of the present invention.

The substrate article 10 comprises a base or bottom layer 12, such as for example a polyethylene terephthalate film, on which has been deposited a metal film 14, by any suitable method or technique, e.g., sputtering, liquid-phase deposition, chemical vapor deposition, etc.

A laser head 16 is coupled by waveguide transmission line 28 to a Nd:YAG laser 30. The Nd:YAG laser in turn is joined by signal transmission line 32 to a computer controller 34, which is programmed with a suitable CAD program for directing the motion of the laser head 16 directing the laser beam 18 onto the substrate article 10.

The CAD program also contains setting instructions for the power intensity level of the laser generation, so that a beam 18 of the desired intensity is generated and directed at the substrate article 10 by the laser head 16. The motion of the laser head 16 for carrying out spiral loop lasing is programmably carried out by means of an x,y,z controller (not shown) associated with the head (gun), so that the spiral loops 20 of the spiral loop lasing pattern are formed by the volatilization of the metal film 14 at the region of impingement of the laser beam thereon.

In the spiral loop lasing pattern shown in FIG. 8, the successive loops of the pattern overlap prior loops of the pattern. The loops illustrated in FIG. 8 are spaced apart along the pathline L—L of the pattern at a spacing, which is exaggerated in the Figure for purposes of illustration. In practice, the loops will be sufficiently closely spaced apart so as to remove a continuous band of metal from the underlying base layer 12.

At the conclusion of the spiral loop lasing operation, a second laser head 22, coupled by waveguide transmission line 36 to the Nd:YAG laser 30, which as mentioned is in turn joined by signal transmission line 32 to a computer controller 34, is programmed by the CAD program through a suitable translation means (not shown) to direct the motion of the laser head 16 and the associated laser beam 24 onto the substrate article 10 for linear motion to form a trench line 26 in the underlying base layer 12.

For the purpose of forming the trench line 26 in the base layer 12, the lasing energy transmitted to the laser head 22 may be at a different and appropriate level, in relation to the lasing energy transmitted to the laser gun 16 for the spiral loop lasing. Typically, the lasing energy level and process conditions required in the respective spiral loop lasing and trench cut lasing operations may be readily determined without undue experimentation, e.g., by varying the power level, gun to substrate spacing, and translational speed of the laser beam, to determine a power, spacing and speed suitable for efficiently performing the lasing operation.

As shown in FIG. 8, the trench line 26 is cut into the substrate base layer 12 along the line L—L which also includes the centers of the respective circles defining the spiral loop lasing pattern. Although such centerline cutting of the isolation trench is preferred, any suitable trench line cutting may be employed.

In lieu of the two-head system shown in FIG. 8, the method described with reference to FIG. 8 of carrying out spiral loop lasing or other overlapping lasing and trench line lasing may be conducted by a single laser head which is programmably directed by the computer controller to conduct the separate operations at the respective appropriate process conditions.

Figure 8A:
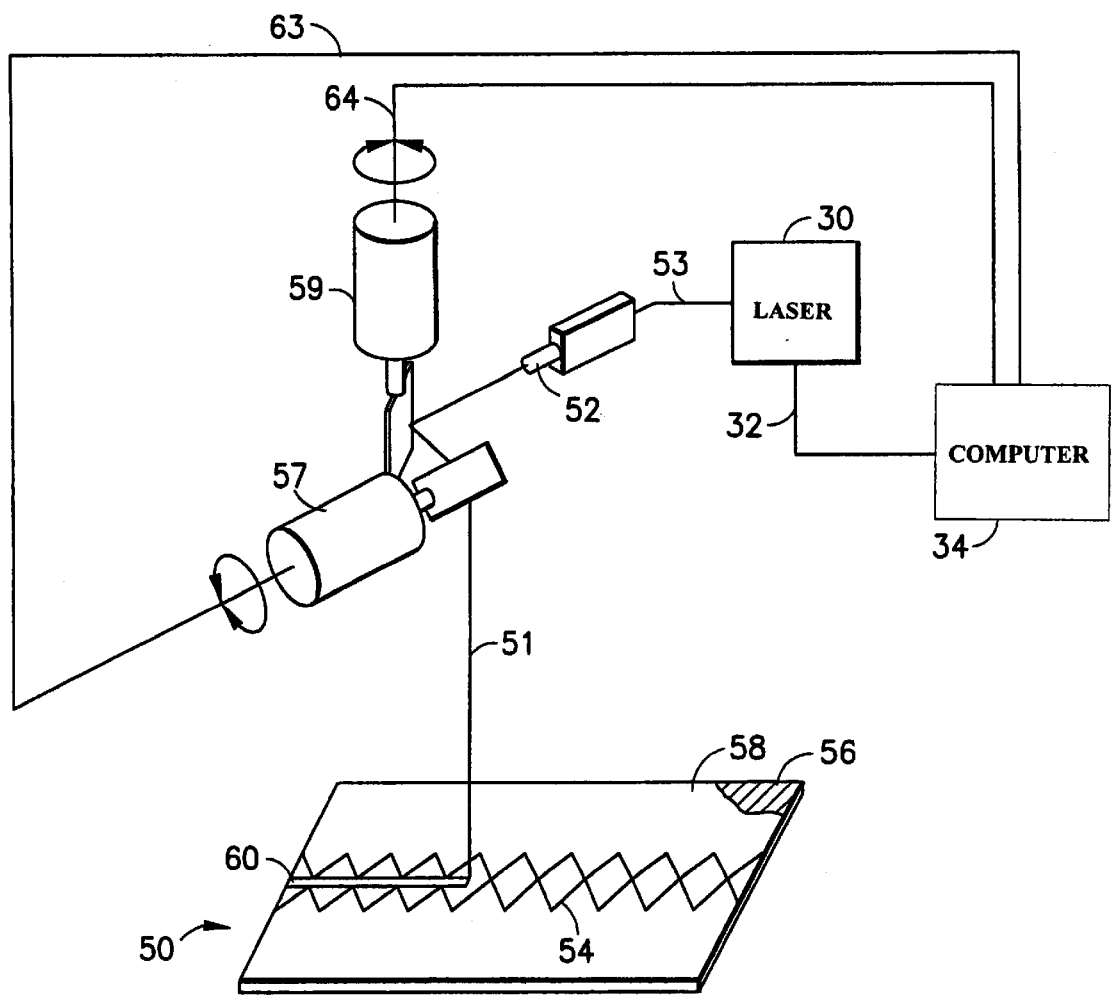
FIG. 8a is a simplified schematic representation of the laser etching system of the invention, showing the use of a single laser beam source, which accomplishes both the overlapping laser beam etching pattern and linear laser beam end product cutting action, utilized in the process of the present invention.

FIG. 8a is a simplified schematic representation of a single head lasing system that may be operated on a metal-coated substrate such as the rear electrode layer of a laminated EL blank. The same laser head can be used to affect the overlapping lasing for removal of a selected region of the electrode layer, and may, after proper adjustment, then be used to cut an insulating single trench through the region of the removed electrode material.

Referring to FIG. 8a, a fully layered EL laminate blank 50 is shown with the rear electrode layer 58 facing up. A protective moisture layer (not shown) could cover the rear electrode layer 58 but such protective moisture layer would be vaporized along with the rear electrode layer during the lasing process and would have to be replaced. Directly underneath the rear electrode layer is dielectric layer 56.

A single laser head 52 is coupled by waveguide transmission line 53 to a Nd:YAG laser 30. The Nd:YAG laser in turn is joined by signal transmission line 32 to a computer controller 34. Y-axis controller 57 is joined by y-signal transmission line 63 to computer controller 34. Similarly, x-axis controller 59 is joined by signal transmission line 64 to computer controller 34. The combined control operation of both x-axis controller 59 and y-axis controller 57 allows for any x-y axis overlapping configuration over the region of selected rear electrode layer 58 to be removed.

A suitable CAD program is used for directing the motion of x-axis controller 59 and y-axis controller 57, which determines the path of laser beam 51 onto blank 50. The CAD program also contains the necessary information relating to relevant material characteristics of the laminate layers so that the proper intensity is used to laser through (if present) a moisture barrier (not shown) and effectively vaporize the electrode layer 58 being directly lased. The overlapping motion depicted in FIG. 8a is a zigzag pattern. The zigzags 54 shown in FIG. 8a represent multiple pass-through with laser beam 51, wherein the spacing is exaggerated in the Figure for the purpose of illustration. Under actual operation, the respective peaks and valleys of the zigzag pattern would be greatly compressed, reducing the total number of pass-through necessary to remove electrode layer 58 from a selected region.

As is the case with the spiral loop pattern depicted in FIG. 8, a deep trench 60 is cut through the region exposed by the overlapping lasing pattern in order to completely electrically isolate the finished edge of the product lamp and cut the final shape of the lamp. The intensity level of laser head 52 is adjusted through waveguide transmission line 53 so that the necessary depth of the cut and associated material vaporization will occur through each of the remaining layers (not shown) of the EL laminate blank 50.

Thus, the single laser head may be programmably directed by the controller 34 and responsive Nd:YAG laser 30, to carry out an overlapping lasing pattern such as spiral loop lasing or zigzag lasing at a first lower intensity to ablate (sublime) the metal film, and demetalize a base layer, followed by the same system then increasing the power level of the laser 30 to the level necessary to form the trench line. In such single head arrangement, the head thus describes a series of closely spaced and overlapping lines of scribing of the metal film to remove the metal in the laser beam impingement areas, followed by a linear sweep of the beam increased then to higher intensity across the band of demetalized surface of the base layer to cut the trench line in the base layer material.

The trench line cutting is preferred in the practice of the invention to ensure that any minute residuum of metal on the demetalized surface after overlapping lasing does not result in short-circuiting or pinpoint non-illuminated areas in the lit face of the EL lamp when the lamp is placed in service.

In some instances, however, it may be satisfactory to perform only the overlapping lasing if the intensity of the lasing and the extent of demetalization are such that the amount of remaining metal film residue is insufficient to cause any short-circuiting or other deleterious behavior in the subsequent use of the lamp.

Figure 9:
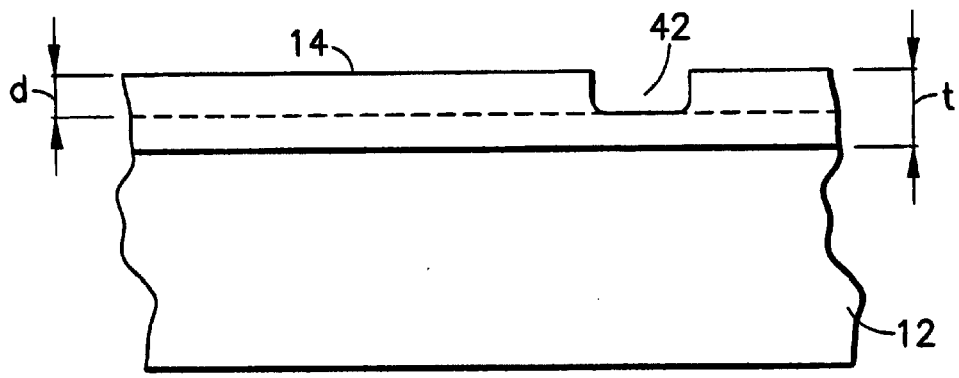
FIG. 9 is a sectional elevation view of a conductor material layer on a substrate, subsequent to laser energy impingement thereon.

FIG. 9 is a sectional elevation view of a conductor material layer 14 on a substrate 12, subsequent to laser energy impingement thereon. The substrate 12 may be of any suitable material of construction, such as a polymeric material, or other coatable substrate, which is compatible with the coated material 14. The material layer 14 in the EL lamp application herein disclosed is a metal, but the inventive process is broadly applicable to the removal of a coating layer from an underlying substrate wherein the coating layer is any suitable material that is sublimable in exposure to the selected lasing energy. The underlying material of the substrate may for example be another conductive material, different from the overlying coating material, or the underlying material may be an insulator, non-conductor, semiconductor, or superconductor material.

As shown in FIG. 9, the circular movement of the spiral loop lasing pattern shown in FIG. 8 produces a cut of depth d in the metal material layer 14 of depth t. The width or lateral extent r of the cut is shown in the drawing.

It may therefore be necessary at such process condition to move the laser beam through the same circular path or a closely proximate path in order to cut through the metal material layer 14 to the underlying substrate 12. Such multi-pass spiral loop lasing processing is contemplated within the broad scope of the present invention. Nonetheless, it is generally preferable, from the standpoint of reducing the processing time involved, to set the lasing energy process parameters at appropriate values to achieve single-pass demetalization of the metal material layer 14 on the substrate 12.

By the same token, the width r of the lased cuts 40 and 42 may be selectively varied in the practice of the invention, by controlling the aperture through which the collimated laser beam is passed from the laser gun.

The invention may therefore be carried out as a process wherein: the first laser beam for volatilizing the first material (coating) layer has a radius $r$, and each curve of the spiral loop lasing pattern has a width $w$, where $w$ is equal to $n \times r$ and $n$ is a number; the first material has a thickness $t$; and during each loop of the spiral loop lasing pattern, the first laser beam sublimes the first material to a depth $d$, where $t$ is less than $n \times d$.

In a specific embodiment, the first laser beam may for example have a radius $r$ and moves in spiral motion, the spiral having a loop length $l$, where $l$ is less than $n \times r$, $n$ is a number equal to $w/r$, and $w$ is the width of the loop.

It will therefore be appreciated that the size, shape and depth of the lased cut in the metal layer (in the spiral loop processing) and underlying substrate (in the optional trench cutting of the substrate) may be widely varied in the general practice of the present invention, depending on the specific materials of construction of the lased article and the particular end use application.

The fabrication of an EL lamp according to the present invention may be carried out as follows. Beginning with the construction of the translucent front electrode, conductive material is placed on a substrate. The conductive material is preferably a transparent conductive material such as indium tin oxide (ITO), indium oxide, aluminum, gold, silver, palladium, nickel, inconnel, platinum, ruthenium, or other metal oxides, metals, conductive polymers, intermetallic compounds, etc. The ITO is a preferred conductive material, and is preferably vacuum deposited to provide a continuous coating extending across the entire substrate to form a transparent film, preferably from about 500 to 1200 Angstroms in thickness, and more preferably about 1000 Angstroms thick. Alternatively, for example, a translucent grid can be used for the front electrode.

The lamp optionally includes a front lead pad and a bus bar. The front lead pad is a conductive pad placed in the area where the front lead connects to the lamp, and serves to protect the conductive front electrode material from a crimping, piercing or pressure pad connection as employed for subsequent lead attachment. The optional bus bar assists in the current-carrying ability of the conductive front electrode material in a lamp having an extended length, for example, and serves to distribute power across the front of the lamp.

The optional bus bar is preferably attached to a lead pad, and it can be layered over the front electrode. The optional bus bar can be layered before the application of conductive material on the front electrode substrate, or after the removal of conductive material from the front electrode substrate. The front lead pad and bus bar are preferably formed by screen printing a conductive ink, comprising a conductive component such as silver, aluminum, nickel, carbon, palladium, copper, graphite, gold, etc., in flake, particle, or other suitable form, dispersed in a polymeric resin carrier and solvent formulation, over the conductive material of the front or rear electrode. The solvent can then evaporated, for example, by placing the panel in an oven, thereby leaving behind a solid film which forms the front lead pad and optional bus bar, or the conductive material film can be otherwise formed and/or cured in an appropriate manner depending on the specific conductive material employed.

The bus bar layers in the general practice of the invention may for example be from about 0.020 to about 0.15 inch wide, on the order of about 0.0005 inches thick, and may be advantageously placed at any suitable locations on the lamp for electrical coupling with associated electrodes, with the recognition that the busbar is opaque and will occlude light emission from the lamp if placed over any light emitting portion.

Next, in accordance with the present invention, at least one region of electrical discontinuity is formed in the conductive material of the front main body electrode, preferably in the area in which the rear lead terminal 190 is attached, and/or the edge or marginal regions of the conductive material film layer. These electrical discontinuity region(s) 166 may for example be formed using mechanical rotary abrasion, lasing, chemical etching, or any other suitable method or technique.

Rotary abrasion processing may for example be carried out so that at least a portion of the electrode substrate surface (formerly overcoated with the conductive material layer) is at least partially devoid of conductive material, being rotationally abradingly "dematerialized" of such conductive material, to such extent as to obstruct the flow of electricity to this area of the front electrode.

As is the case with the demetalized regions of the rear electrode in the method of the present invention, the entire surface area of the conductive material on the selected region (e.g., for lead attachment and/or for edge isolation) front electrode need not be completely removed, so long as the region of removed conductive material serves to obstruct the flow of electricity. Preferably, the periphery of such region is at least substantially, and preferably is completely, devoid of conductive material. For a region of such type having conductive material within it that is not abradingly removed, the conductive material is preferably located inside the periphery of the region, and more preferably, in approximately the center of the region.

In preferred embodiments, the mechanically rotationally abraded area corresponds to the region in which a lead terminal is attached, and/or which forms an edge isolation area in the product lamp article. This mechanically rotationally abraded area is not a thin line or a narrow groove, but is rather of substantial dimensional extent, e.g., having a dimension in each of the x and y directions of at least 0.10 inch (the x dimension being parallel to the end edges of the lamp, and the y dimension being parallel to the longitudinal edges of the lamp, when the lamp is of square or rectangular shape).

The phrase "absent conductive material" as used herein means substantially devoid of conductive material. Preferably, a region of the substrate that is substantially devoid of conductive material has at least about 90% of the conductive material removed; more preferably, at least about 95% of the conductive material removed; and most preferably, about 100% of the conductive material is removed. For example, in an electrode structure comprising a polymeric substrate having coated thereon a film of ITO, a mechanically rotationally abraded area "absent conductive material" may have about 10% or less of the ITO film residue (relative to that originally coated on the substrate) on such area.

For those embodiments in which the mechanically rotationally abraded area is used to electrically isolate the attachment of the electrodes to electrical contacts, the mechanically rotationally abraded area may be shaped, for example, in a circle or oval or ellipse. Alternatively, the mechanically rotationally abraded area may have at least three sides, and it may be, for example, in the shape of a square or a rectangle. None of the sides of the block need be equal in size and the mechanically rotationally abraded area need not be symmetric.

The mechanically rotationally abraded area may have an edge of the lamp as one or more of its borders. Alternatively, the mechanically rotationally abraded area may be positioned in a location of the electrode that is spaced inwardly from the edges of the lamp.

Once the mechanically rotationally abraded area is formed on the front electrode layer, the front electrode layer, front lead pad, and bus bar are covered with a phosphor layer, preferably by screen printing with a window above the lead pad to facilitate subsequent electrical lead connection.

To prevent moisture from penetrating the phosphor particles, the phosphors may optionally be encapsulated. The phosphor material may in some instances be dispersed within an insulating layer. The phosphor layer may for example have a thickness on the order of about 0.002 inches.

An optional next layer of a clear resin may be applied over the phosphor layer by screen printing or other suitable coating method, leaving exposed windows over the lead pads.

The next layer of the lamp is a dielectric layer, formed of a high dielectric constant material such as barium titanate which is suitably dispersed in a polymeric binder. The dielectric layer is deposited over the phosphor layer, preferably by screen printing, leaving a window over the front lead pad. Preferably, the dielectric layer is about 0.001 inch thick.

An optional next layer of a clear resin may be applied over the dielectric layer by screen printing or other suitable coating method, leaving exposed windows over the lead pads.

A rear electrode then is deposited on the dielectric layer, leaving a window over the front lead pad. The rear electrode may comprise conductive particles, such as silver, carbon, graphite, or nickel particles, which are advantageously dispersed in a polymeric binder to form a screen-printable ink. The present invention in preferred practice utilizes the rear electrode as a stock metalized film material, which may be demetalized by lasing in accordance with the invention, either before fabrication, or subsequent to fabrication, of the multilaminate assembly including the metalized rear electrode sheet.

By way of example, the rear electrode may be about 0.0005 inch thick when composed of silver particles. Preferably, the rear electrode is sufficiently thick to provide the requisite conductivity, and may also be opaque so that light does not emanate from the rear of the lamp.

In one particular embodiment of the present invention, the rear electrode may be lased so that it terminates at least about 0.010 inch from the edge of the lamp; more preferably, the rear electrode is at least about 0.020 to about 0.050 inch away from the edge. The distance of the rear electrode from the edge of the lamp will be determined by the application of the lamp. Preferably, the rear electrode is not farther than about 0.050 inch from the edge since this results in a smaller luminescent area within the lamp. The rear electrode also preferably terminates at least about 0.010 inch, and more preferably at least about 0.020 to about 0.050 inch away from the front lead pad. It will be recognized that the lasing process of the present invention may be suitably carried out so as to provide any appropriate dimensional characteristics to the rear electrode sheet, so that the set-back of the rear electrode edge in relation to the periphery of the underlying layers of the EL lamp is satisfactory for the intended usage of the lamp, to electrically isolate the phosphor layer and otherwise provide the desired use characteristics for the lamp.

An optional next layer of a clear resin may be applied over the rear electrode layer by screen printing or other suitable coating method.

Other additional layers may optionally be included in the EL lamp of the present invention. For example, color filters may be applied. Color filters include, for example, Roscolene-817-Amber, Roscolene-837-Red and Roscolene-861-Blue (Rosco Corp., Port Chester, N.Y.). The lamp can optionally include an optical filter to enhance infrared emission, for example. See, for example, U.S. Pat. No.

4,857,416, which is incorporated by reference herein in its entirety. Additionally, if desired, the lamp can optionally include an optical filter to enhance or modify ultraviolet emission.

Dyes may also be included within the phosphor material itself, using paint mixing or dye dispersion techniques. An illustrative example of a dye which may be utilized in the practice of the invention is Nile Red 52445 red fluorescent dye (CAS Registry No. 7385-67-3, Eastman Kodak Co., Rochester, N.Y.).

The lamp can also optionally have, for example, protective or decorative coatings over its surface. Additionally, the lamp can have a colored transparent coating on its surface to impart a selected color to the light emitted by the lamp.

A moisture barrier layer is preferably applied over the rear electrode, for example, to help prevent electrical shorting or to provide a moisture barrier thereby protecting the phosphor particles. The moisture barrier layer is preferably screen printed over the rear electrode, and may be cut-back by lasing in the previously described manner, so that the rear electrode and the rear moisture barrier layer arc coextensive in area extent of the respective films.

An additional electrical insulating layer can also be applied, for example the insulating layer may be pre-formed and laminated to the lamp using, for example, a pressure sensitive adhesive. Alternatively, a screen printed electrical isolation layer could be used. If a pre-formed film is used, the insulation in the area of the window may optionally be cut away to allow an electrical connection to the electrode layers. The window area may be cut away before or after the application of the insulation.

Next, lead terminals are optionally attached to the front lead pad and the rear electrode to supply a means for providing power to the EL lamp. A first lead terminal is attached to the rear electrode and the front electrode, in the area coinciding with the mechanically rotationally abraded area of the front electrode. A second lead terminal is attached to the front electrode, in an area other than the mechanically rotationally abraded area. The second lead terminal is not attached to the rear electrode. The demetalized area on the front electrode thus permits attachment of the first lead terminal to both the front substrate where the conductive material has been removed, and to the rear electrode, without causing short circuiting.

A lead terminal that causes deformation in the layers of the lamp may be used, which for example, pierces, crimps, or compresses a layer or layers of the lamp. The demetalized area of an electrode layer in the EL lamps of the present invention provides an electrically discontinuous area that permits attachment of a lead terminal that may optionally be deforming in character.

For example, eyelets that are inserted in holes cut in the lamp and crimped in place may be used for lead terminals. Other lead terminals include, for example, an alligator clip, a flexible film contact, spring-loaded connectors, and conductive rubber. Thus, the lead terminals can be fully or semi-invasive.

It will be understood by those skilled in the art that an EL lamp can alternatively be made from the rear electrode forward.

The lamp may be formed as multiple units, for example, in a panel, and each individual lamp may then be cut from the panel.

The completed EL lamp may be used for a number of different lighting purposes, as for example for floor illumination in theaters, aircraft, and residential and commercial buildings, for directional lighting for guidance in indoor or outdoor venues, for nighttime signage illumination, for decoration or aesthetic enhancement of building exteriors, etc.

Although the invention has been described with respect to particular features, aspects and embodiments thereof, it will be apparent that numerous variations, modifications, and other embodiments are possible within the broad scope of the present invention, and accordingly, all variations, modifications and embodiments are to be regarded as being within the spirit and scope of the invention.

What is claimed is:

1. A process for removing material, the process comprising the steps of:
   a) directing a first laser beam having a first energy level at a first material;
   b) moving the first laser beam across the first material with a spiral pattern motion, subliming the first material in a spiral pattern and exposing a region of a second material under the spiral pattern;
   c) directing a second laser beam having a second energy level at the exposed region of the second material; and
   d) moving the second laser beam across the exposed region of the second material along a line subliming the second material along the line within the exposed region.

2. The process of claim 1, wherein:
   the first material is a conductor; and
   the second material is an insulator.

3. The process of claim 1, wherein:
   the first material is a conductor; and
   the second material is a semiconductor.

4. The process of claim 1, wherein:
   the first laser beam is produced by a laser selected from the group of materials including neodymium:yttrium-aluminum-garnet (Nd:YAG), carbon dioxide ($CO_2$), erbium:yttrium-aluminum-garnet (Er:YAG), ion-argon, ion-krypton, nitrogen, ruby and titanium sapphire; and
   the second laser beam is produced by a laser selected from a group of materials including neodymium:yttrium-aluminum-garnet (Nd:YAG), carbon dioxide ($CO_2$), erbium:yttrium-aluminum-garnet Eb:YAG, ion-argon, ion-krypton and nitrogen.

5. The process of claim 1, wherein:
   the first laser beam has a radius $r$;
   each curve of the spiral motion has a width $w$, where $w$ is equal to $n \times r$ and $n$ is a number;
   the first material has a thickness $t$; and
   during each loop of the spiral pattern, the first laser beam sublimes the first material to a depth $d$, where $t$ is less than $n \times d$.

6. The process of claim 1, wherein:
   the first laser beam has a radius $r$ and moves in spiral motion, the spiral having a loop length $l$, where $l$ is less than $n \times r$, $n$ is a number equal to w/r, and $w$ is the width of the loop.

7. A process for fabricating an electroluminescent lamp, the process comprising the steps of:
   a) preparing a first conductive layer on substrate material;
   b) directing a first laser beam having a first energy level at the first conductive layer;
   c) moving the first laser beam across the first conductive layer with a spiral pattern motion, subliming the first conductive layer and exposing a region of the substrate material under the spiral pattern;

d) depositing a layer of phosphor material over the first conductive layer and exposed substrate material;

e) depositing a dielectric layer over the layer of phosphor material;

f) depositing a second conductive layer over the dielectric layer.

8. The process of claim 7 comprising the further steps of:

g) directing a second laser beam having a second energy level at the second conductive layer over the exposed region of the substrate material; and h) moving the second laser beam along the exposed region of the substrate material subliming a line of material including the second conductive layer, the dielectric, the phosphor material, and the substrate material.

9. A method of making an electroluminescent lamp including sequential front electrode, phosphor, dielectric and rear electrode layers, comprising laser etching the rear electrode to sufficient extent to electrically isolate the phosphor layer from said rear electrode layer.

10. A process for making electroluminescent lamps from an electroluminescent laminate having at least a first conductive layer, a phosphor layer, a dielectric layer and a second conductive layer, said process comprising the steps of:

a) directing a first laser beam having a first energy at a conductive layer applied on the dielectric layer; and b) moving the first laser beam over the conductive layer in an overlapping pattern motion subliming the conductive layer along a region lased by the first laser beam and exposing the dielectric layer beneath the conductive layer.

11. The process according to claim 10, wherein the region lased by the first laser beam is void of the conductive layer.

12. The process according to claim 10, wherein the over lapping pattern motion of the first laser beam comprises a spiral looping pattern.

13. The process according to claim 10, wherein the overlapping pattern motion of the first laser beam comprises a plurality of zigzag patterns.

14. The process according to claim 10, wherein the conductive layer having a region sublimed from it comprises the rear electrode layer of the electroluminescent laminate.

15. The process according to claim 14, wherein the rear electrode layer is coated with a moisture protecting layer unaffected by said first laser beam.

16. The process according to claim 10, wherein the conductive layer having a region sublimed from it comprises the front electrode layer of the electroluminescent laminate.

17. The process according to claim 16, wherein the front electrode layer is overlaid with a moisture protecting layer unaffected by said first laser beam.

18. The process according to claim 10 further comprising the steps of:

a) directing a second laser beam having a second energy at the region lased by the first laser beam; and b) moving the second laser beam along a path over the region lased by the first laser beam subliming through the electroluminescent laminate yielding a final lamp edge representing a final outline of the electroluminescent lamp.

19. The process according to claim 18, wherein moving the second laser beam further comprises electrically isolating the conductive layer from elements exterior of the final lamp edge.

20. The process according to claim 10 further comprising the step of outlining the final pattern of the lamp, said outlining comprising the steps of:

a) directing a second laser beam having a second energy at the region lased by the first laser beam; and b) ablating through the electroluminescent laminate forming an electrically insulated edge along a path of the second laser beam yielding a final lamp edge representing a final outline of the electroluminescent lamp.

21. A process for fabricating an electroluminescent lamp, the process comprising the steps of:

a) preparing a first conductive layer on substrate material;

b) depositing a layer of phosphor material over the first conductive layer ;

c) depositing a dielectric layer over the layer of phosphor material;

d) depositing a second conductive layer over the dielectric layer;

e) directing a first laser beam having a first energy level at the second conductive layer; and f) moving the first laser beam across the second conductive layer in an overlapping motion, subliming the second conductive layer and exposing a region of the dielectric layer under the overlapping pattern.

22. The process of claim 21, wherein the overlapping motion comprises a spiral looping pattern subliming the second conductive layer and exposing a region of the dielectric layer under the spiral looping pattern.

23. The process of claim 22, wherein:

the first laser beam has a radius $r_1$;

each curve of the spiral motion has a width $w$, where $w$ is equal to $n \times r$ and n is a number; and the second laser beam has a radius $r_2$, where $r_2$ is less than $w$.

24. The process of claim 21 comprising the further steps of:

a) directing a second laser beam having a second energy level at the exposed region of the dielectric layer; and b) moving the second laser beam along the exposed region of the dielectric layer subliming a line of material including the dielectric, the phosphor material, the first conductive layer, and the substrate material.

25. The process of claim 21, wherein the overlapping motion comprises a zigzag pattern with multiple passes subliming the second conductive layer and exposing a region of the dielectric layer under the zigzag pattern.

26. An electroluminescent lamp including sequential front electrode, phosphor, dielectric and rear electrode layers, wherein the rear electrode comprises a metalized film including a marginal region demetalized by spiral loop lasing to electrically isolate the phosphor layer from the rear electrode.

27. An electroluminescent lamp according to claim 26, wherein the marginal region comprises a trench cut thereon.

28. An electroluminescent lamp according to claim 26, wherein the rear electrode comprises a polyethylene terephthalate film coated with indium tin oxide.

29. An electroluminescent lamp according to claim 26, wherein the electroluminescent lamp further comprises a moisture barrier layer adjacent to the rear electrode layer.

* * * * *

UNITED STATES PATENT AND TRADEMARK OFFICE
CERTIFICATE OF CORRECTION

PATENT NO : 6,066,830

DATED : May 23, 2000

INVENTOR(S) : Douglas Cline; Thomas Supples; George Rosenberger

It is certified that error appears in the above-identified patent and that said Letters Patent are hereby corrected as shown below:

| | |
|---|---|
| Column 6, line 5: | after "1995" insert --,--. |
| Column 9, line 13: | "The materials and . . ." should start a new paragraph. |
| Column 19, line 37: | after "over" insert -- - --. |
| Column 20, line 16: | "layer ;" to --layer;--. |
| Column 20, line 34: | change "$r_1$" to --$r_1$--. |
| Column 20, line 36: | change "$n$ x $r$" to --$n$ x $r_1$--. |
| Column 20, line 36: | change "n" to --$n$--. |
| Column 20, line 37: | change "$r_2$, where $r_2$" to --$r_2$, where $r_2$--. |

Signed and Sealed this

Twenty-second Day of May, 2001

*Attest:*

NICHOLAS P. GODICI

*Attesting Officer*  *Acting Director of the United States Patent and Trademark Office*